United States Patent [19]

Miller et al.

[11] Patent Number: 5,818,197
[45] Date of Patent: Oct. 6, 1998

[54] ADAPTIVE BATTERY CHARGER WITH UNIVERSAL INTERFACE PLATE

[75] Inventors: Jay S. Miller, Mason City; Bret Evan Mumm, Nora Springs; Trent Lee Bollman, Orchard, all of Iowa

[73] Assignee: Alexander Manufacturing Corp., Mason City, Iowa

[21] Appl. No.: 739,914

[22] Filed: Oct. 30, 1996

[51] Int. Cl.$^6$ .................................................. H02J 7/00
[52] U.S. Cl. ........................ 320/107; 320/160; D13/117
[58] Field of Search .................................. 320/2, 21, 22, 320/23, 24, 107, 160; D13/107

[56] References Cited

U.S. PATENT DOCUMENTS

| | | | |
|---|---|---|---|
| 4,806,840 | 2/1989 | Alexander et al. | 320/149 |
| 5,444,353 | 8/1995 | Shinohara et al. | 320/39 |
| 5,550,453 | 8/1996 | Bohne et al. | 320/22 |
| 5,592,064 | 1/1997 | Morita | 320/2 |
| 5,617,007 | 4/1997 | Keidl et al. | 320/22 |

OTHER PUBLICATIONS

*Alexander Batteries Communications Catalog 1994–95*, Jul., 1994.

Primary Examiner—Peter S. Wong
Assistant Examiner—Gregory J. Toatley, Jr.
Attorney, Agent, or Firm—Kenyon & Kenyon

[57] ABSTRACT

A universal interface plate has a predetermined and universal configuration suitable for connecting any one of a plurality of types of rechargeable batteries to the circuitry of a charging device. The universal plate is adapted to any type of rechargeable battery using an appropriate bay adapter, the bay adapter including a first interface for mounting the bay adapter to the universal interface plate and a second interface for accommodating a particular type of battery. The charging device utilizes a ramping charge method whereby batteries are initially charged at a low charging rate, thereby allowing safe charging of low and high capacity batteries utilizing a single charging algorithm. The charging rate is increased incrementally after determining whether the incremental current increase would cause the power to the battery to exceed the maximum power that can be handled by the bay. If the maximum charging rate is reached, charging is continued at the previous rate, otherwise the charging current is increased by the incremental amount thereby providing for rapid ramp-up of charging current for high capacity batteries while providing a low charging current for low capacity batteries, thus preventing overcurrent charging of low capacity batteries. During charging, the battery is monitored to determine whether a termination criterion is met.

15 Claims, 5 Drawing Sheets

ADAPTIVE BATTERY CHARGER WITH UNIVERSAL INTERFACE PLATE

FIELD OF THE INVENTION

The present invention relates to battery charging devices in general and, more particularly, to an adaptive battery charger interface and an adaptive charging method.

BACKGROUND INFORMATION

Charging and recharging of batteries is well known in the art. Rechargeable batteries include, for example, Nickel Cadmium batteries, Nickel Metal Hydride batteries, Lead Acid batteries and Lithium Ion batteries. Single-cell rechargeable batteries are generally available in standard sizes, for example, in sizes "AAA", "AA", "C" and "D".

Multi-cell batteries, commonly referred to as "battery packs," are produced in various shapes and sizes which are selected in accordance with specific application and/or design requirements. For example, rechargeable batteries are used in cordless and wireless communication devices, such as cellular telephones, as well as in portable electronic devices (e.g., laptop computers) and medical devices. Most rechargeable battery packs include interface circuitry which provides a unique and predefined electrical interface between the battery and the device powered thereby and/or between the battery and a charging device.

The interface circuitry typically includes, for example, conductors for interconnecting the battery cells and for connecting the battery cells to external contacts. The external contacts of the interface circuitry are configured to interface with the charging device and to interface with the device powered by the battery. The interface circuitry may include additional components, for example, a circuit which conltrols the input/output voltage, temperature characteristics and/or power of the battery pack.

In electronic devices such as video cameras, portable computers, cellular telephones, etc., that are powered by custom-designed battery packs having predetermined and unique interface circuitry, the shapes, sizes and locations of the external contacts on the battery interface vary between battery packs. Additionally, the cell chemistry, the number of cells, the configuration of the cells and the interface circuitry also vary for different battery packs. Therefore, charging devices are generally custom-designed in accordance with the unique specifications of the battery packs for which they are used. A typical custom-designed battery charger includes a battery accommodating portion, commonly referred to as a "cup" (or a "bay" or "base" or "holder") having electrical contacts which are configured to engage the unique and predefined contacts on the battery interface.

There are known chargers which are suitable for charging multiple types of cell chemistries and/or cell counts. Even in devices whose charging bays can support different types of batteries, as in the HME® or CADEX® charging devices for example, the battery interface for each type of battery must be physically installed and later removed if a different type of battery is to be charged, thus exposing the user to safety hazards such as exposed and energized contacts of the charging device when installing or removing a battery interface.

There are also known charging devices having sockets for connecting external, interchangeable charging bays, such as the CHRISTIE CASP® charging device, wherein each charging bay is connected to a battery to be charged via a particular interface cord having a plug at one end which connects to a socket of the charging; device and to a battery holder at the other end of the interface cord designed to hold a particular type of battery. Changing interface cords in such known battery chargers may be inconvenient and unsafe. For example, when a user replaces one of the interface cords when the charging device is active, the user may be exposed to energized electrical contacts. Additionally, such replacement of the battery interface often requires reprogramming of the charging circuitry, e.g., selection of a charging program suitable for the new type of battery as well as always leaving a length of the interface cord extending from the charging device.

There are many known methods of controlling the charging of rechargeable batteries in order to improve charging efficiency and to extend the useful life of batteries. It is appreciated by those skilled in the art that optimal charging of batteries requires flexibility in selecting charging parameters, e.g., voltage and current, to account for variations in battery parameters, such as cell chemistry, cell capacity and the number of cells. These parameters affect the characteristic charging curve of the battery. For example, with fast charging, batteries are generally charged at the highest, possible current. Fast charging is commonly referred to as charging at the C rate, i.e., charging at a current amperage numerically equal to the battery capacity C, in ampere-hours, whereby the battery is fully charged in one hour. Many known rechargeable batteries, however, can be safely charged at currents up to twice the C rate, commonly referred to as the 2C rate. However, it is difficult to identify the capacity of many rechargeable batteries (e.g. low capacity cellular phone batteries) and since overcharging may seriously damage a battery, particularly a relatively low capacity battery, e.g., a battery having a capacity of less than 1000 mA-hr, the high charging current must be timely terminated to avoid overcharging. For example, if a conventional, fast charging current were applied to a low capacity battery, the low capacity battery would be damaged. Thus, low capacity batteries require a separate, low capacity charger, or separate charging programs.

One known method of controlling the charging of, for example, Nickel Cadmium batteries is based on voltage monitoring, wherein fast charging is applied continuously until a predetermined voltage is reached. For example, U.S. Pat. No. 4,806,840, the disclosure of which is incorporated herein by reference, describes a voltage monitoring method in which fast charging is terminated when the voltage across the battery drops by a certain amount or at a certain rate after reaching a peak. Another known method of controlling charging is based on temperature monitoring, wherein the fast charging is terminated when a cutoff temperature or a cutoff change in temperature is reached. Another method is described in U.S. Pat. No. 5,177,427, the disclosure of which is incorporated herein by reference, which describes a charging termination method that derives a voltage signal indicative of the actual battery potential and performs a comparison to determine whether the battery voltage should be used for switching purposes.

Thus, in charging systems utilizing conventional fast charging methods, charging is initiated with a high current, e.g., the C rate, which is subsequently reduced or terminated as the battery becomes fully charged. Such prior art methods of fast charging are inadequate, however, for charging batteries in a wide range of capacities or for batteries having a sensitive chemistry.

SUMMARY OF THE INVENTION

It is an objective of the present invention to provide a versatile and adaptive charging device for charging various types of batteries and battery packs.

It is a further objective of the present invention to provide a universal charger interface which is adaptable for connection to various types of battery interfaces.

It is still a further objective of the present invention, to provide a method of charging batteries which enables charging of batteries in a wide range of chemistries and capacities.

According to one aspect of the present invention, a universal interface plate has a predetermined and universal configuration suitable for connecting any one of a plurality of types of rechargeable batteries to the circuitry of a charging device. The universal plate is adapted to any type of rechargeable battery using an appropriate bay adapter. Such a bay adapter preferably includes a first interface for mounting the bay adapter to the universal interface plate and a second interface for accommodating a particular type of battery.

According to another aspect of the present invention, a ramping charge method is used, whereby batteries are initially charged at a low charging rate that is gradually increased. Preferably, the charging rate is not increased indefinitely but, rather, is limited by a maximum charging rate which is determined based on the available power and maximum power for each bay. The charging rate is increased incrementally after determining whether the incremental current increase would cause the power to the battery to exceed the maximum power that can be handled by the bay. If the maximum charging rate is reached, charging is continued at the previous rate, otherwise the charging current is increased by the incremental amount. During charging, the battery is monitored to determine whether a termination criterion is met and, if the termination criterion is met, charging is terminated. Any termination criterion known in the art may be used, for example, a voltage "after-peak" detection criterion as described in U.S. Pat. No. 4,806,840 or other voltage monitoring or temperature monitoring techniques as are know in the art.

BRIEF DESCRIPTION OF THE DRAWINGS

The present invention will be understood and appreciated more fully from the following detailed description of embodiments of the present invention, taken in conjunction with the drawings.

DETAILED DESCRIPTION OF THE INVENTION

Figure 1:
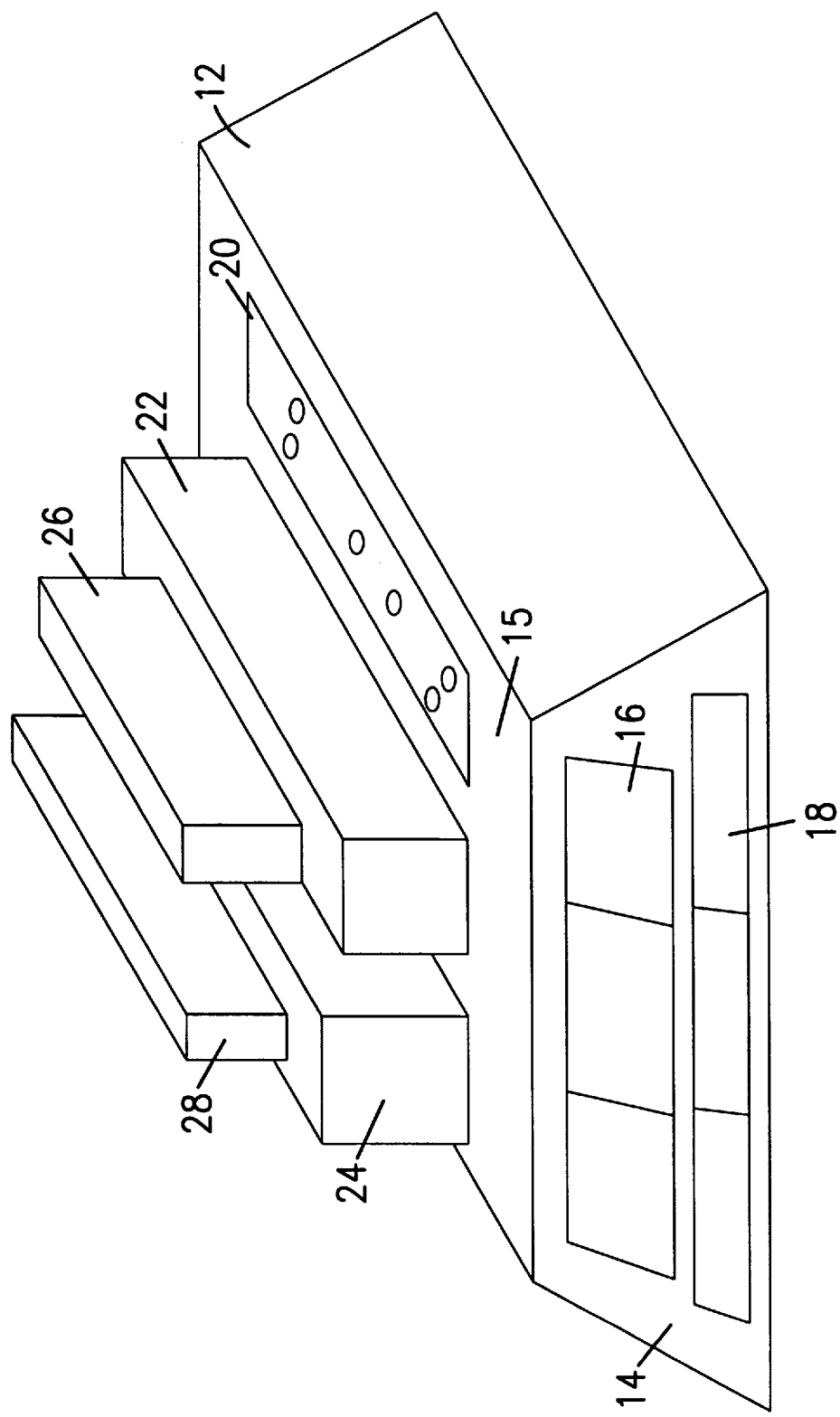
FIG. 1 is a schematic, perspective illustration of a charging device having universal interface plates in accordance with an embodiment of the present invention.

Reference is made to FIG. 1 which schematically illustrates a charging device 10 according to the present invention having a housing 12. Housing 12 includes a front panel 14 which accommodates a display 16 and user controls 18 and has a top surface 15. One or more universal interface plates 20, the construction and operation of which are described in detail below, are mounted externally on housing 12, e.g., on top surface 15. Preferably, universal interface plates 20 are mounted in mounting slots formed in surface 15.

FIG. 1 shows, for example, a first bay adapter 22 and a second bay adapter 24 mounted on two respective universal interface plates 20 of charging device 10. While a charging device is described having two universal interface plates according to the present invention, a charging device according to the present invention could have only one or more than two universal interface plates, such as the OPTIMIZER 2000® series station charging device manufactured by Alexander Batteries of Mason City, Iowa.

As schematically illustrated in FIG. 1, first bay adapter 22 is adapted to accommodate a first type of rechargeable battery, for example a 6-cell Nickel Cadmium battery pack 26, and bay adapter 24 is adapted to accommodate a second type of rechargeable battery, for example a 6-cell Lithium Ion battery pack 28. In accordance with the present invention, bay adapters 22 and 24 are removably mounted on respective universal interface plates 20 so as to be readily replaceable by different bay adapters for charging other types of battery packs, for example, batteries having different cell counts and/or chemistries. Thus, the universal interface plates according to the present invention, which provide a universal interface to multiple different battery adapters, allow each bay of a charging device to recharge any type of battery without reconfiguring any connections within the charging device and without requiring any obtrusive extensions from the charging device, such as a unique interface cord for each type of rechargeable battery.

Figure 2A:
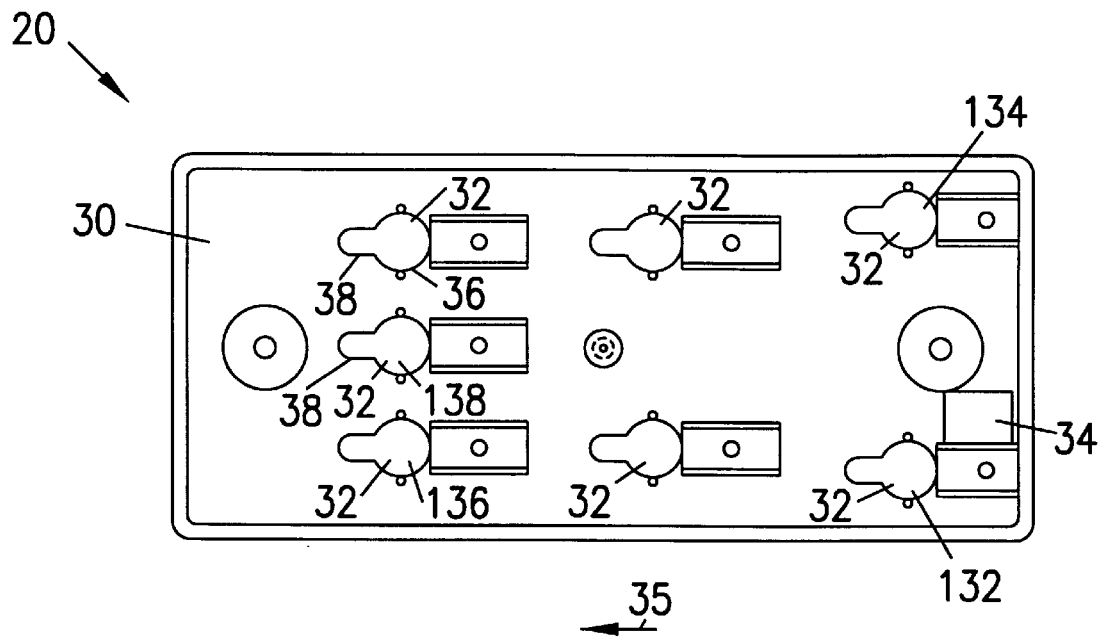
FIG. 2A is a schematic top view of a universal interface plate according to the present invention.
Figure 2B:
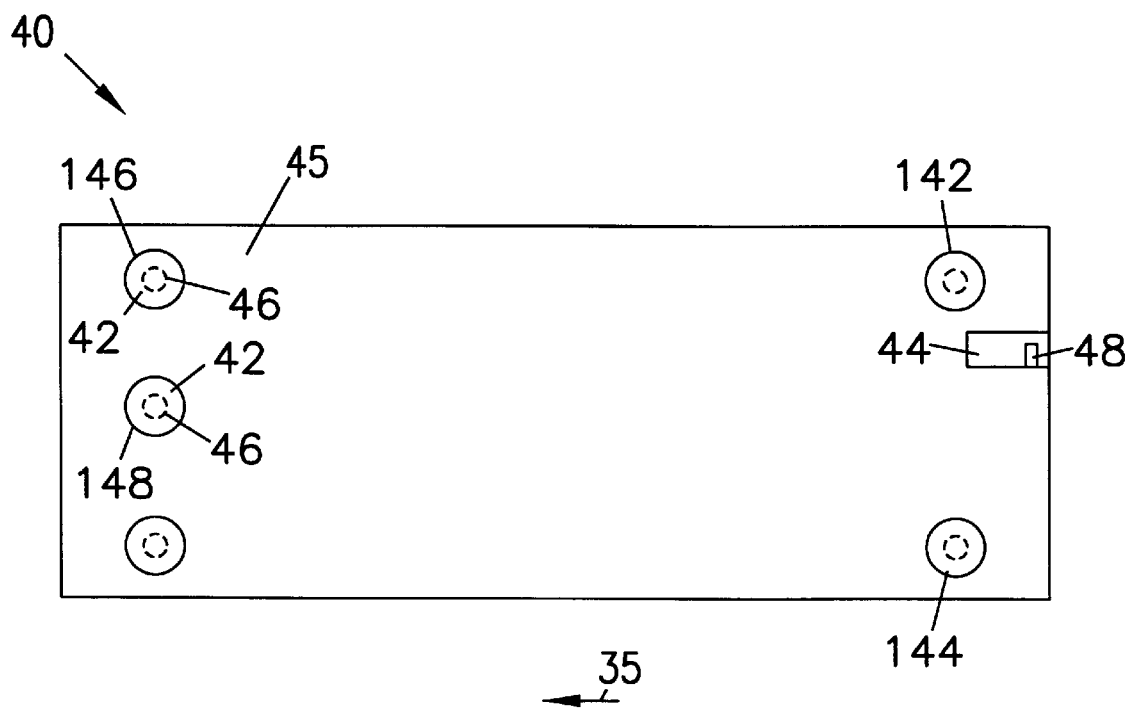
FIG. 2B is a schematic bottom view of a bay adapter according to the present invention.

FIG. 2A schematically illustrates a top view of universal interface plate 20, showing upper surface 30 in greater detail. FIG. 2B schematically illustrates a bottom view of first bay adapter 22 or of second bay adapter 24, showing a universal bottom interface 40 on the bay adapter for mating with the universal interface plate 20. Universal interface plate 20 includes, for example, a plurality of contacts 32, preferably leafspring contacts, which are accessible via a plurality of respective apertures 36. FIG. 2A illustrates seven contacts 32, but the number of contacts may be larger or smaller, depending on specific functional or decorative design requirements. For example, in one embodiment of charging device 10, as described below, only four of the seven contacts 32 are used. Contacts 32 may include spring contacts and are connected to charging and discharging circuitry in housing 12 of charging device 10.

In an embodiment of the present invention, the contacts 32 which are used include contacts 132, 134, 136 and 138. In this embodiment of the present invention, contact 132 is assigned to battery positive, contact 134 is assigned to battery negative, contact 136 is assigned to an identification circuit and contact 138 is assigned to an thermistor circuit. It should be appreciated that, in other embodiments of the present invention, any number of contacts 32 as well as any configuration of the contacts may be used, in accordance with specific requirements.

As shown in FIG. 2B, universal bottom interface 40 of either battery adapter 22 or battery adapter 24 includes a bottom surface 45 and a plurality of contacts 42. The contacts 42 are preferably flat, "nail-head" shaped contacts which are separated from surface 45 by relatively narrower stems 46. Contacts 42 are configured to removably interface with corresponding contacts 32 of the universal interface plate 20 when bottom interface 40 is mounted onto universal plate 20. In the embodiment described above, in which only four contacts 32 of universal plate 20 are used, contacts 42 of interface 40 include contacts 142, 144, 146 and 148 which are configured to interface contacts 132, 134, 136 and 138, respectively, of universal interface plate 20. Thus, contact 142 is assigned to battery positive, contact 144 is assigned to battery negative, contact 146 is assigned to the identification circuit and contact 148 is assigned to the thermistor circuit.

In an embodiment of the present invention, bay adapters 22 and 24 are each mounted on plate 20 as follows. First, the bay adapter 22, or 24, is urged downwards with contacts 42 engaging corresponding contacts 32 until surface 45 of bottom interface 40 reaches the surface 30 of charging device 10. This may require, for example, application of a slight pressure to overcome the counter-force applied by leaf-spring contacts 32. The bay adapter 22, 24 is then pushed, for example, in the direction indicated by arrow 35 such that stems 46 of contacts 42 slide along narrower extensions 38 of apertures 36. The flat heads of contacts 42 are, for example, wider than extensions 38 and are thus caught between contacts 32 and the narrow extensions. This provides a pressure contact between contacts 32 and contacts 42.

Bottom interface 40 further includes, for example, a locking arrangement to ensure secure mounting of the bay adapters 22, 24 on respective universal plates 20. For example, the locking mechanism may include an elastic lever 44 having a tooth 48 which is adapted to lock into an indentation 34 which is formed in surface 30 of universal interface plate 20. During mounting of the bay adapter 22, 24, when bottom interface 40 is pushed in the direction of arrow 35, lever 44 is urged away from surface 30 until tooth 48 falls into a locked position in slot 34. To dismount the bay adapter, the locking engagement between tooth 48 and slot 34 is released by pushing lever 44 away from surface 30 and the bay adapter is pushed in a direction opposite that of arrow 35.

Figure 3:
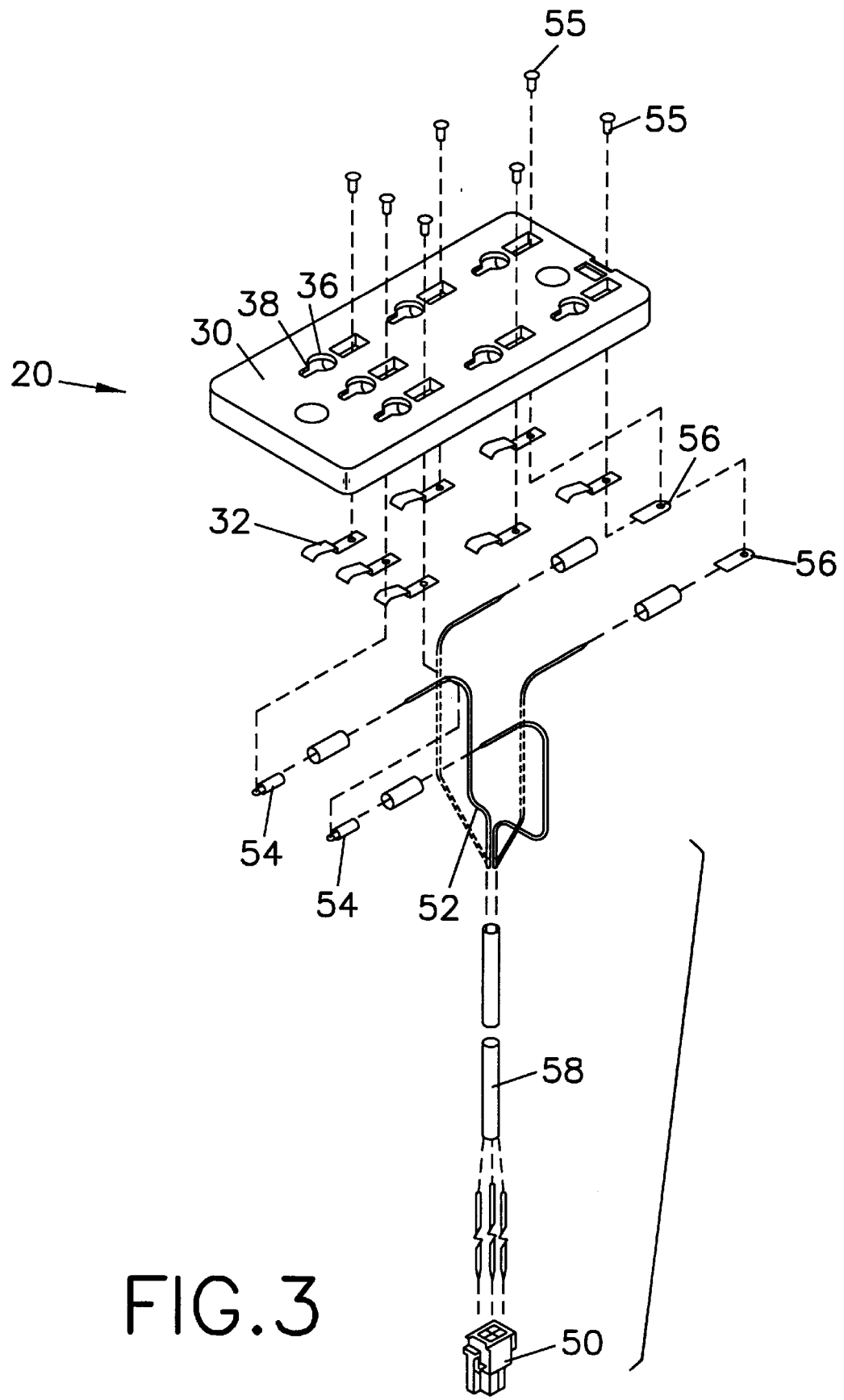
FIG. 3 is an exploded perspective illustration of the universal interface plate shown in FIG. 2A.

Reference is now made to FIG. 3 which schematically illustrates a perspective, exploded view of universal interface plate 20. FIG. 3 illustrates how, for example, leaf-spring contacts 32 are preferably connected to universal interface plate 20 using attachment hardware 55. As shown in FIG. 3, charging, discharging, identification and thermistor circuits of charging device 10 are connected by, for example, contacts 132, 134, 136 and 138 via connectors 54 and 56, wires 52 and a four-channel receptacle 50. Wires 52 are preferably protected by insulating tubing 58, as is known in the art, such as a VERSA FIT® protective layer. In the exemplary embodiment of FIG. 3, connectors 54 are shown as "solder terminal" connectors and connectors 56 are shown as "crimp terminal" connectors, however, any other suitable type of connector may be used for either or both connectors 54 and 56. It should be appreciated that, in other embodiments of the present invention, the number of contacts in use and the contact configurations may be different.

Figure 4:
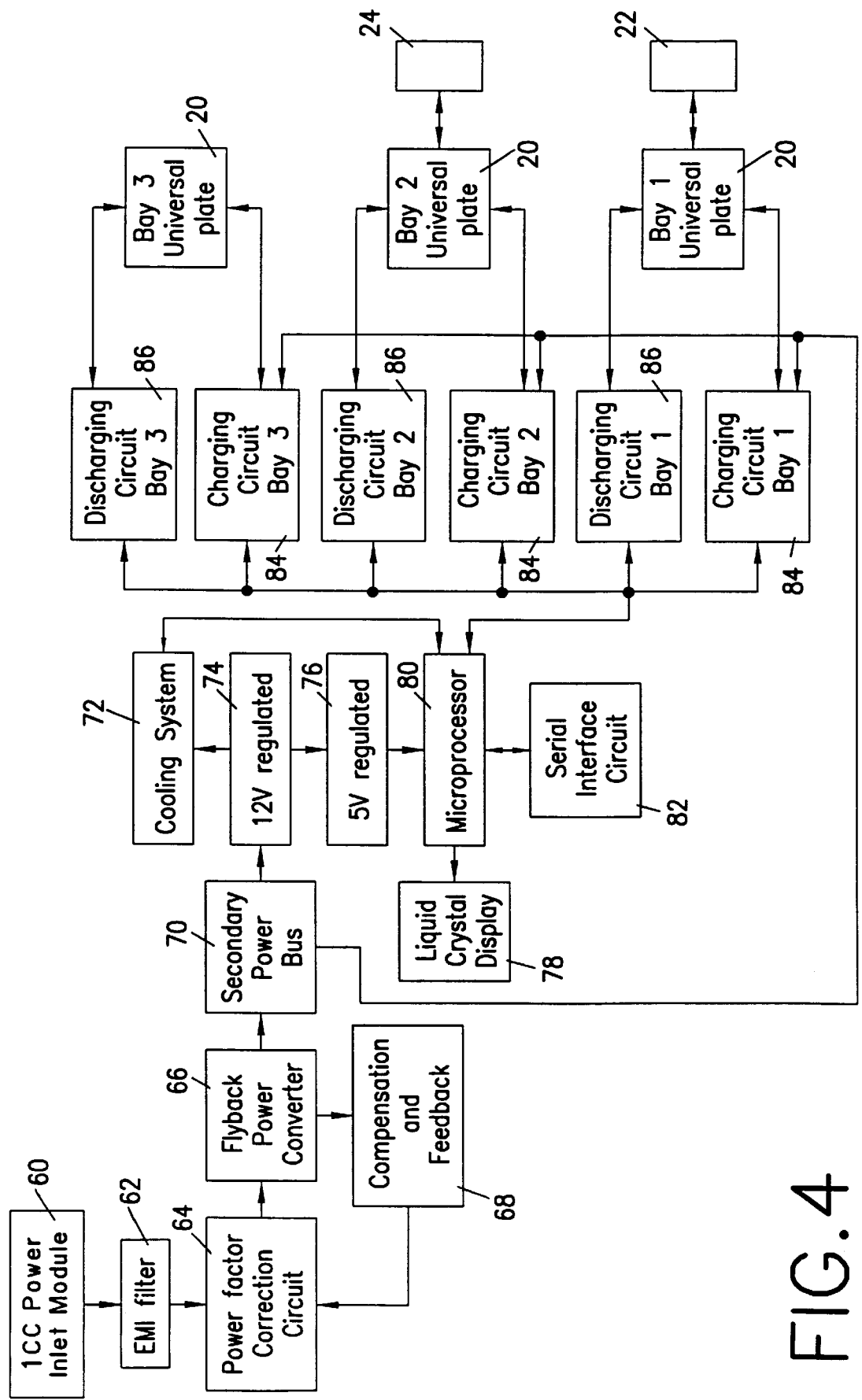
FIG. 4 is a schematic block diagram of a charging device according to the present invention.

FIG. 4 schematically illustrates a block diagram of a charging device 10 in accordance with an embodiment of the present invention. Power to operate the charging device 10 is provided, for example, via a power inlet module 60 and an Electromagnetic Interference EMI) filter 62, a power factor correction circuit 64 and a flyback power converter 66, as are known in the art. Power factor correction circuit 64 controls the input power based on a correction input from a compensation and feedback circuit 68, which input is based on a feedback from flyback power converter 66, as is known in the art. It will be appreciated by persons skilled in the art that module 60, filter 62, correction circuit 64 and converter 66 are known elements of a "switch mode" power supply.

The controlled power input from power converter 66 is provided to a plurality of charging circuits 84. Via conductors 52, each charging circuit 84 addresses predefined contacts 32 of a respective universal interface plate 20, e.g., contacts 132 and 134 (FIG. 2A). Power converter 66 also supplies electric power to a first voltage regulator 74 via a secondary power bus 70. In one embodiment of the present invention, first regulator 74 supplies a regulated voltage of 12 Volts to operate certain elements of charging device 10, for example a cooling system 72, as is known in the art. The voltage output of first regulator 74 is also supplied as input to a second voltage regulator 76 which preferably provides a lower regulated voltage, for example, a regulated voltage of 5 Volts.

Second voltage regulator 76 supplies power to a processor 80 that controls the operation of, for example, a display driver 78, a serial interface circuit 82, cooling system 72 and charging circuits 84. Display driver 78 includes, for example, circuitry for driving display 16, illustrated in FIG. 1, which preferably includes a liquid crystal display as is known in the art. Processor 80 also controls the activation of a plurality of discharging circuits 86. Similar to charging circuits 84, each discharging circuit 86 addresses predefined contacts 32 of a respective universal interface plate 20, e.g., contacts 132 and 134 (FIG. 2A) via conductors 52. Processor 80 also receives inputs responsive to the voltage across each of the batteries being charged via, for example, an analog to digital (AID) converter built into the processor 80.

Processor 80, such as an NEC K0-Series® microprocessor chip, can be operated in a number of alternative modes of operation, e.g., four modes of operation described below, which modes are selectable by the user using controls 18 on panel 14. Such operation is possible, for example, in an Alexander Batteries OPTIMIZER 2000® charging device. Preferably, the modes of operation for the charging device 10 are separately selectable for each universal interface plate 20, e.g., different operating modes may be selected for a battery 26 in first bay adapter 22 and for a battery 28 in second bay adapter 24.

For example, in an "analyze" mode of operation of the charging device 10, the battery 26, 28 is automatically fully charged, then automatically fully discharged and, finally, automatically fully recharged again. When the cycle is complete, the ending voltage and capacity of the battery can be displayed for comparison with the rated capacity of the battery. In a "discharge" mode of operation, the battery 26, 28 is automatically fully discharged so that voltage and accumulated capacity can be compared with the battery's specifications. In a "condition" mode of operation, a number of full cycles of charging, discharging and recharging, for example, three full cycles, are executed in series whereby, at the end of the series of cycles the battery 26, 28 is fully charged. The condition mode of operation is particularly useful for improving the performance, e.g., the charging capacity, of batteries which are operating at less than capacity due to, for example, a "memory effect" that has reduced the capacity of the battery from, for example, overcharging or repetitive shallow discharging. A fourth mode of operation, the charge mode, is possible by simply inserting a battery 26, 28 into a battery adapter 22, 24 connected to a universal interface plate 20, in which case the battery will be charged to a full charge. In all modes of operation, the charging and discharging sessions are preferably controlled by charging circuits 84 and discharging circuits 86, respectively, which circuits are controlled by processor 80.

Information related to the charging, discharging and conditioning of a battery 26, 28, for example, the battery voltage and capacity, is preferably displayed on display 16 of the charging device 10 together with an indication of the selected mode-of-operation. Display 16 may include a separate display region for each bay.

In one embodiment of the present invention, each bay adapter, e.g., adapter 22 or adapter 24, includes a battery identification circuit which allows the charging device 10 to identify the type of battery to be charged for example, the chemistry and cell count of the battery. For example, the battery identification circuit may include an identification resistor, associated with contact 146 of bottom interface 40 (FIG. 2B) and, thus, addressable via contact 136 of universal interface plate 20 (FIG. 2A). As appreciated by those skilled in the art, the resistance of the identification resistor can be readily determined, for example, by driving a predetermined current through the identification resistor and measuring the resultant voltage across the identification resistor. This identification procedure is preferably carried out via software in processor 80, or a comparable hardware implementation, while current to the identification resistor is applied via at least one contact 32 of universal plate 20, for example, via contact 136. A sufficiently different identification voltage is associated with each type of bay adapter, so as to avoid misidentification of the battery type. The voltage measured via the identification circuit can also be used, for example, to select the appropriate threshold values for the termination algorithm for the battery being charged.

The resistances of the identification resistors for the different bay adapters, e.g., bay adapters 22 and 24, are selected, for example, from a predefined set of values between approximately 100Ω to approximately 100KΩ. An identification look-up-table, which associates each identification voltage, for example one of 24 different voltage levels, with a corresponding battery type is preferably stored in a memory associated with processor 80. It should be appreciated that other identification means, as are known in the art, can be used for identifying the batteries being charged. For example, the bay adapter can be identified based on a mechanical or optical code formed thereon, in which case interface 20 preferably includes a suitable reading device.

Similar to the identification circuit, the thermistor circuit operates by applying a known voltage across the thermistor. As the resistance of a thermistor varies with temperature, the measured voltage drop across the thermistor reflects the resistance of the thermistor, which varies inversely with temperature. Accordingly, the measured voltage corresponds with a particular temperature and can be used by the processor 80 to implement a termination algorithm which is based on termpature.

Figure 5:
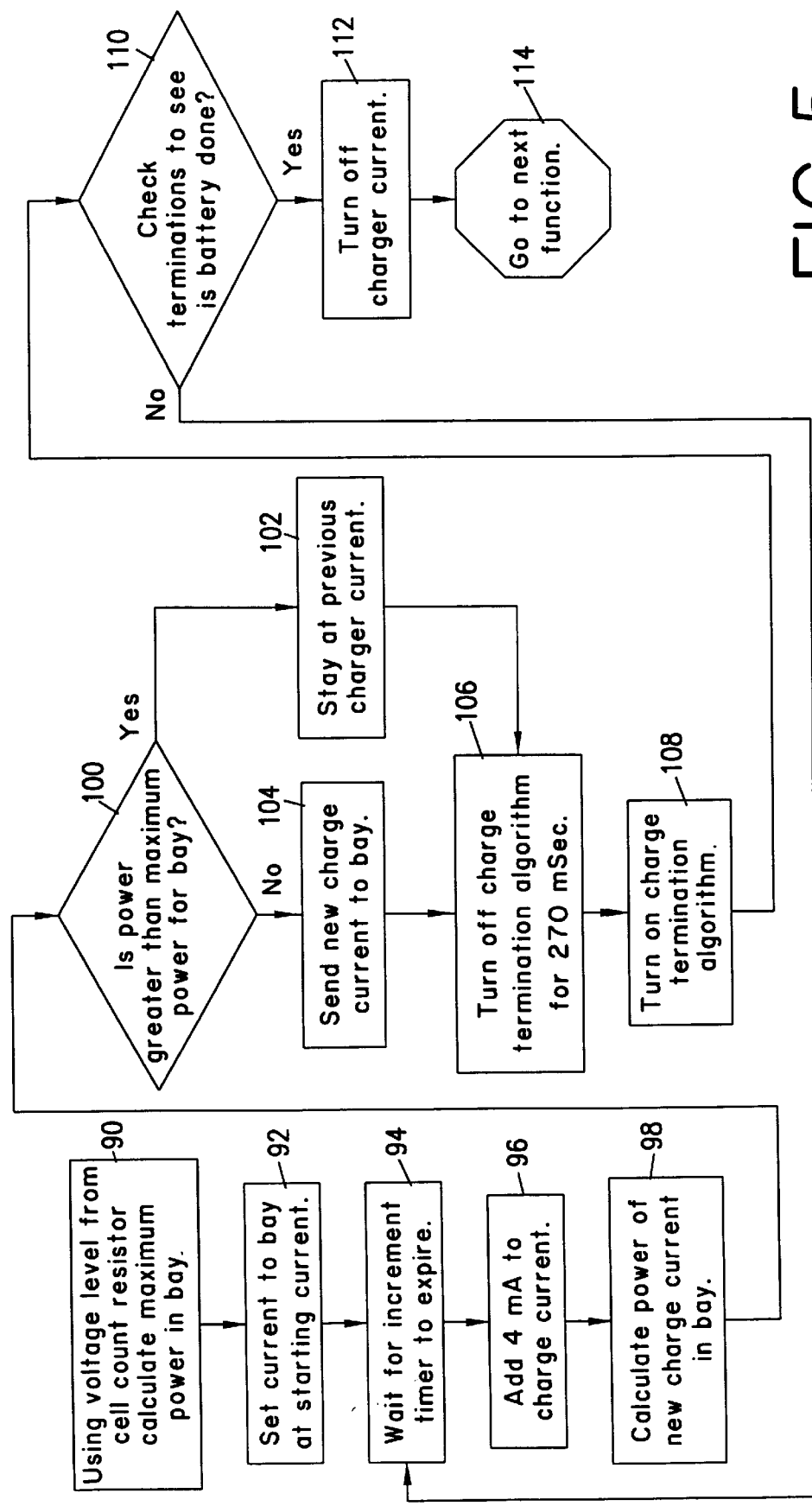
FIG. 5 is a flow chart showing a charging algorithm in accordance with an embodiment of the present invention.

FIG. 5 schematically illustrates a flow chart of an exemplary charging algorithm utilizing a ramping charge in accordance with the present invention. The algorithm depicted in FIG. 5 is preferably executed by appropriate software in processor 80 of charging device 10. For example, the software can utilize global variables stored in the flash electronically erasable programmable read only memory (EEPROM) of the processor 80, the variables being capable of change via a computer connected to the serial interface circuit 82 of the charging device 10 if necessary.

As indicated at block 90, processor 80 first determines the type of battery being charged based on, for example, an identification voltage and the previously described look-up-table. Using the look-up-table, processor 80 determines a maximum available charging power for each bay based on, for example the chemistry and cell count of the identified battery. For example, the maximum power for nickel cadmium and nickel metal hydride batteries cold be based on a maximum voltage of 2 V/cell, while the maximum voltage could be 2.45 V/cell for lead acid batteries and 4.1 V/cell for lithium ion batteries. Alternatively, the maximum power available to each bay can be dependent on the hardware components of the charging device 10. Then, as indicated at block 92, charging is initiated at a battery-type-dependent initial charging current or at a predetermined initial charging current. For example, a current on the order of 300 mA has been determined to be a particularly suitable predetermined initial charging current for multiple types of rechargeable batteries. As indicated at block 94, the initial charging current is maintained for a predetermined, incremental charging period, for example, 30 seconds, which period may also be battery-type dependent for optimal charging.

As indicated at block 96, the charging current is increased for calculation purposes by a predetermined increment, for example 4 mA. As indicated at block 98, processor 80 calculates a charging power based on the voltage across the battery and the increased charging current. The charging power is then compared to the maximum charging power, as indicated at block 100.

Referring to block 102, if the charging power is not greater than the maximum charging power for the bay, the increased charging current is sent to the battery via the bay. If the charging power exceeds the maximum charging power for the bay, however, the charging current is maintained at its previous level, as indicated at block 104. This ensures that the maximum power for the bay will not be exceeded. In addition, the ramping charge method according to the present invention allows safe charging of low and high capacity batteries utilizing a single charging algorithm and also provides for rapid ramp-up of charging current for high capacity batteries while providing a low charging current for low capacity batteries, thus preventing overcurrent charging of low capacity batteries.

After a predetermined time period, for example a period on the order of 270 milliseconds, as indicated at block 106, a charging termination algorithm is activated (block 108) to determine whether the battery is fully charged. The delay period indicated at block 106 is helpful in avoiding a phenomenon known in the art as "battery ringing." Battery ringing can result when the current to the battery is suddenly changed during either a charge or discharge operation, thus causing the voltage of the battery to become unstable for a short period of time and spike or oscillate. The spike or oscillation could cause unwanted termination of the charging current in a charging device that analyzes voltage characteristics. The 270 ms delay in the charging algorithm according to the present invention avoids such premature termination.

In one embodiment of the present invention, the termination algorithm includes periodically testing the battery to determine whether a predetermined termination criterion is met, as indicated at block 110. Any termination criterion known in the art may be used, for example, a voltage "after-peak" detection criterion as described in U.S. Pat. No. 4,806,840. This termination criterion, also known as a "negative delta" termination criterion, is suitable for terminating charging of Nickel Cadmium and Nickel Metal Hydride rechargeable batteries upon detection of, for example, a 12 mV/cell change in voltage. Other termination methods, as are known in the art, may be used for other types of batteries. For example, a simple voltage monitoring technique in which charging is terminated when a predetermined maximum voltage across the battery is reached may be used for Lead Acid and Lithium Ion type rechargeable batteries using threshold values of, for example, 3.45 V/cell and 4.1 V/cell, respectively. Additionally or alternatively, temperature monitoring techniques as are known in the art may be used, whereby charging is terminated based on the temperature of the charged battery as provided via the thermistor circuit. According to an embodiment of the present invention, the appropriate termination criterion for each bay is selected automatically by processor 80, based on the identity of the battery in the bay adapter, which may be determined by measuring the voltage across the identification resistor as described above.

As long as the termination criterion is not fulfilled, steps 94 to 100 are repeated whereby the charging current is repeatedly increased, at block 96, until the maximum charging rate is reached. For example, if the maximum charging rate is 1,000 mA and charging is initiated at a rate of 300 mA which is then increased by a 4 mA increment every 30 seconds, the maximum charging rate will be reached after 87 minutes of charging. It is possible, however, that the termination criterion will be fulfilled before the maximum charging rate is reached. When the termination criterion is met, charging is terminated as indicated at block 112 and processor 80 proceeds to execute another function, as indicated at block 114, e.g., a discharging algorithm, based on the selected mode of operation described previously.

The charging device according to the present invention is suitable for charging batteries having, for example, capacities of between 200 milliamp-hours to 9000 milliamps-hours. Furthermore, the charging device according to the present invention is suitable for charging, for example, 3–12 cell Nickel Cadmium or Nickel Metal Hydride batteries, 3–9 cell Lead Acid batteries and 2–5 cell Lithium Ion batteries.

While preferred embodiments of the present invention have been described by way of illustration, it will be understood that they are not limiting and that the present invention may be carried into practice with many modifications, variations and adaptations, without departing from its spirit or exceeding the scope of the claims.

What is claimed is:

1. A battery charger interface, comprising:
    a plate having a plurality of openings disposed therethrough, the plate being releasably engagable with a respective one of a plurality of battery adapters via a predetermined number of the plurality of openings, each of the plurality of battery adapters also being releasably engagable with a respective one of a plurality of different types of rechargeable batteries; and
    a plurality of first contacts disposed in the predetermined number of the plurality of openings, the plurality of first contacts being electrically connectable to a plurality of second contacts of the respective one of the plurality of the battery adapters, wherein the plurality of first contacts connect each of the plurality of battery adapters to a charging circuit of a battery charger.

2. The battery charger interface according to claim 1, wherein the plate is mounted to the battery charger.

3. The battery charger interface according to claim 1, wherein the plurality of first contacts include a battery positive contact, a battery negative contact, an identification circuit contact and a thermistor circuit contact.

4. The battery charger interface according to claim 3, wherein the plurality of second contacts include a battery positive contact, a battery negative contact, an identification circuit contact and a thermistor circuit contact.

5. The battery charger interface according to claim 1, wherein the plurality of different types of rechargeable batteries includes a nickel cadmium battery, a nickel metal hydride battery, a lead acid battery and a lithium ion battery.

6. The battery charger interface according to claim 1, wherein the charging circuit is coupled to a control circuit, the control circuit terminating a charging of at least one of the plurality of different types of rechargeable batteries as a function of a termination criterion.

7. A charging device comprising:
    a power supply;
    at least one charging circuit coupled to the power supply;
    a control circuit coupled to the at least one charging circuit; and
    at least one universal charger interface plate coupled to the at least one charging circuit, the universal charger interface plate including
        a plate having a plurality of openings disposed therethrough, the plate being releasably engagable with a respective one of a plurality of battery adapters via a predetermined number of the plurality of openings, each of the plurality of battery adapters also being releasably engagable with a respective one of a plurality of different types of rechargeable batteries, and
        a plurality of first contacts disposed in the predetermined number of the plurality of openings, the plurality of first contacts being electrically connectable to a plurality of second contacts of the respective one of the plurality of the battery adapters, wherein the plurality of first contacts connect each of the plurality of battery adapters to a charging circuit of a battery charger.

8. The charging device according to claim 7, wherein the control unit includes a microprocessor, the microprocessor instructing the charging circuit to provide a ramping charge, via the universal interface plate, to the battery.

9. The charging device according to claim 8, wherein the microprocessor instructs the charging circuit to provide the ramping charge by
    a) charging the battery at an initial charging rate for a first predetermined period of time,
    b) increasing the initial charging rate by a predetermined increment to provide a next charging rate,
    c) determining whether the next charging rate exceeds a maximum charging rate,
    d) if the next charging rate is no greater than the maximum charging rate, charging the battery at the next charging rate for a second predetermined period of time, and
    e) repeating steps b) and c) until one of the next charging rate exceeds the maximum charging rate and the battery charging is complete.

10. The charging device according to claim 7, wherein the control circuit terminates a charging of at least one of the plurality of different types of rechargeable batteries as a function of a termination criterion.

11. A method of charging a rechargeable battery, comprising the steps of:
    a) charging the battery at an initial charging rate for a first predetermined period of time;
    b) increasing the initial charging rate by a predetermined increment to provide a next charging rate;
    c) determining whether the next charging rate exceeds a maximum charging rate, the determining step including the steps of
        determining a maximum charging power for the battery as a function of a chemistry and a cell count of the battery, determining a charging power for the battery as a function of a voltage of the battery and the next charging rate, and comparing the maximum charging power and the charging power;

d) if the next charging rate is no greater than the maximum charging rate, charging the battery at the next charging rate for a second predetermined period of time; and e) repeating steps b) and c) until one of the next charging rate exceeds the maximum charging rate and the battery charging is complete.

12. A method of charging a rechargeable battery, comprising the steps of:

a) charging the battery at an initial charging rate for a first predetermined period of time, b) increasing the initial charging rate by a predetermined increment to provide a next charging rate;

c) determining whether the next charging rate exceeds a maximum charging rate;

d) if the next charging rate is no greater than the maximum charging rate, charging the battery at the next charging rate for a second predetermined period of time;

e) repeating steps b) and c) until one of the next charging rate exceeds the maximum charging rate and the battery charging is complete; and f) terminating charging of the battery as a function of a termination criterion.

13. The method according to claim 12, wherein the termination criterion includes a predetermined temperature of the battery.

14. The method according to claim 12, wherein the termination criterion includes a negative-delta termination criterion.

15. The method according to claim 12, wherein the termination criterion includes a maximum voltage termination criterion.

* * * * *